July 31, 1956     R. DUDLEY     2,756,856
CENTRIFUGAL CLUTCHES

Filed Feb. 28, 1952     2 Sheets-Sheet 1

INVENTOR
Randolph Dudley
BY
ATTORNEY

INVENTOR
Randolph Dudley
BY
ATTORNEY

United States Patent Office 2,756,856
Patented July 31, 1956

2,756,856
CENTRIFUGAL CLUTCHES

Randolph Dudley, Peoria, Ill., assignor to Altorfer Bros. Company, Peoria, Ill., a corporation of Illinois Application February 28, 1952, Serial No. 273,837

5 Claims. (Cl. 192—105)

This invention relates to improvements in centrifugal clutches adapted for two-way engagement to allow the driving motor to reach a desired speed before engagement of the clutch. It is adapted for use particularly on the driving motor of a clothes washing machine, although it may be used in many other applications wherever desired.

Various centrifugal clutches have been proposed heretofore, but these have not been entirely satisfactory for use on the driving motor of a washing machine, because they are too complex in structure, heavy and expensive to build, or for various other reasons.

One object of this invention is to improve the construction of centrifugal clutches to adapt these for use on the driving motor of a washing machine in order to obtain two-way engagement thereof and allowing the motor to reach the predetermined speed before engagement.

Another object of the invention is to provide in a centrifugal clutch for the proper slippage in starting the engagement without jamming of the mechanism by a pulling action applied to the clutch shoes rather than a pushing action, in either direction of movement or driving of the power means.

Still another object of the invention is to provide for a frictional contact between the driving key plate and the clutch shoes of an appreciable amount toward the middle of the weight which will improve materially the action of the clutch shoes upon operation of the driving member.

Still another object of the invention is to provide for ventilation of the clutch assembly to dissipate the heat caused by the friction between the clutch shoes and the drum.

These objects may be accomplished according to one embodiment of the invention by the provision of a driving member with a key plate secured thereto, which engages frictionally with one or more clutch shoes supported thereby in position for engaging a clutch drum. The clutch shoe or shoes are suspended by the key plate, but the driving action therebetween is at the forward end portion of each of the clutch shoes so as to pull the weight of the latter according to the direction of driving motion, thereby providing the proper slippage in starting the clutch without jamming. The key plate engages in a slot in the middle of each shoe with a frictional contact face therebetween of an appreciable amount particularly toward the middle of the shoe, thus supporting the shoe and holding it in proper position for engaging action when the predetermined speed of the driving member has been attained. The drum or housing of the clutch may be provided with one or more vent holes therein to dissipate the heat caused by the frictional engagement of the clutch.

This embodiment of the invention is illustrated in the accompanying drawings in which.

Figure 1:
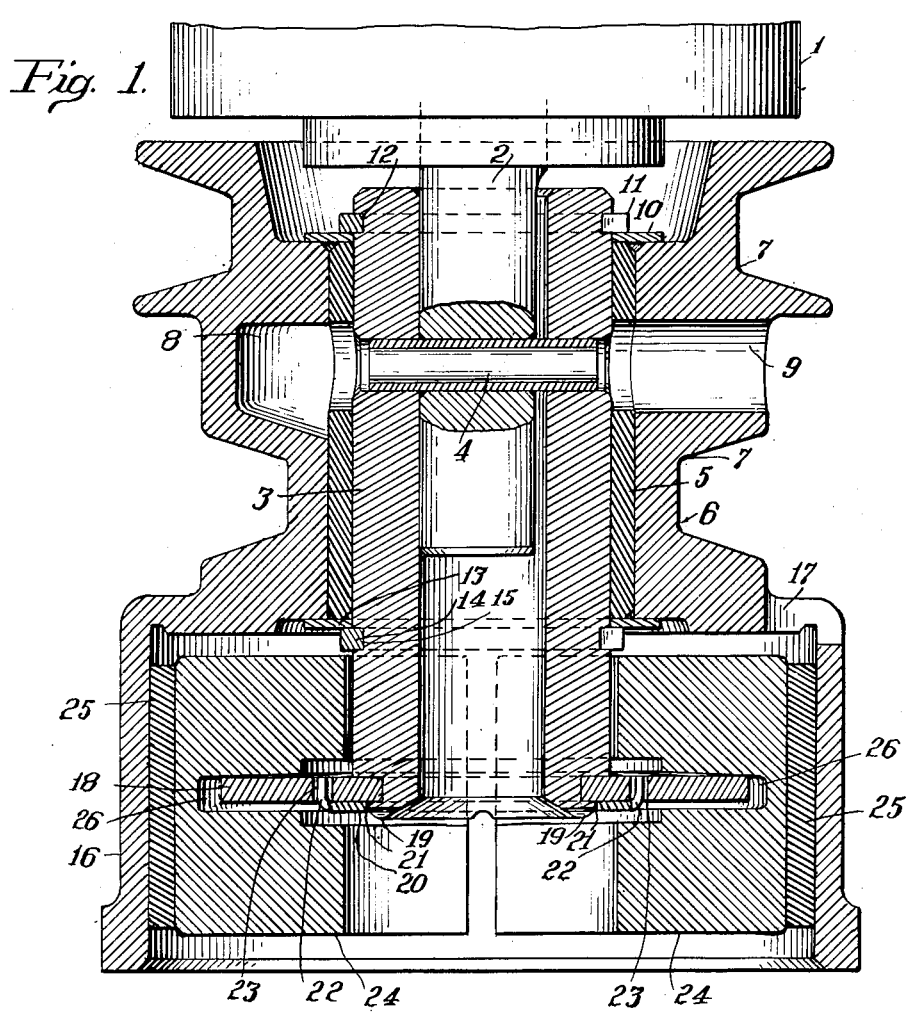
Fig. 1 is a vertical sectional view through the clutch, with parts in elevation.
Figure 2:
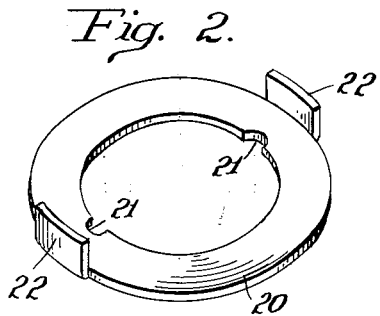
Fig. 2 is a perspective view of a mounting collar, detached.

The invention is shown as applied to a driving motor generally designated by the numeral 1, such as the motor which operates a clothes washing machine, for purpose of illustration. It will be understood, however, that the clutch may be used wherever desired and is not limited to this application. The motor 1 is provided with the usual armature shaft 2 for driving the clutch.

A driving member for the clutch is designated at 3 and constitutes a tubular drive shaft telescoped over the armature shaft 2. The driving member 3 is secured rigidly to the armature shaft 2 in any suitable manner, a pin 4 being shown for the puropse and extending transversely through the driving member 3 and through the armature shaft 2.

The driving sleeve 3 is journaled in a sleeve bearing 5 within the hub portion of a pulley generally designated at 6, having one or more belt engaging portions, of which two grooves are shown at 7 in the periphery thereof for engagement by V-belts.

The pulley 6 is provided with a circumferential channel 8 around bearing sleeve 5, which may be filled with a lubricant when assembling the parts, for lubricating the bearing sleeve and the mounting of the pulley 6 thereon, which is journaled on the bearing sleeve. The pulley 6 also has an opening 9 in one side thereof through which the pin 4 may be inserted, the bearing sleeve 5 also having aligned openings in opposite sides thereof for assembly of said pin.

The bearing sleeve 5 and pulley 6 are confined on the driving sleeve 3 by a washer 10 surrounding the driving sleeve over the adjacent portions of the ends of the bearing sleeve 5 and the hub of the pulley 6. A split spring ring 11 engaged in a circumferential groove 12 in the upper end of the driving sleeve 3 confines the washer 10 and thereby holds the bearing sleeve 5 and the pulley 6 in place on the driving sleeve at the top of the latter.

A washer 13 also confines these parts at the bottom surrounding the lower end portion of the driving sleeve 3 and underlying the adjacent portions of the bearing sleeve 5 and hub of the pulley 6, as shown in Fig. 1. The washer 13 is confined by a split spring ring 14 engaged in a peripheral groove 15 in the driving sleeve 3.

The pulley 6 also has rigidly fixed thereto a clutch drum generally designated at 16, which is shown as cast in one integral piece with the pulley 6, although these may be separate parts rigidly secured together if desired. The clutch drum 16 is shown as provided with one or more vent holes 17 therein to dissipate the heat caused by friction during the operation of the clutch.

Figure 3:
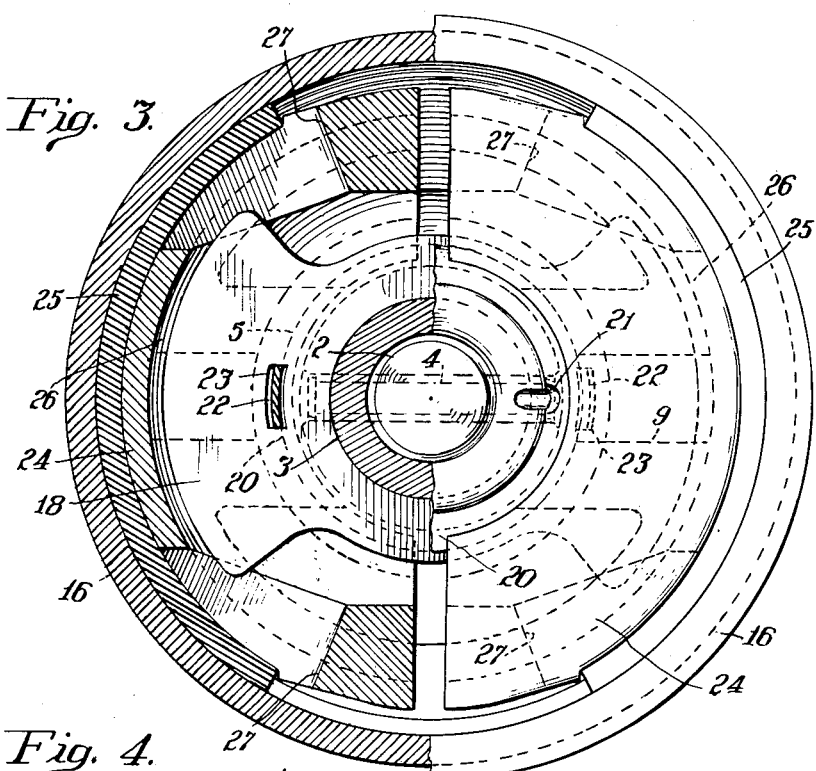
Fig. 3 is a bottom plan view of the clutch, with a part thereof in section.
Figure 4:
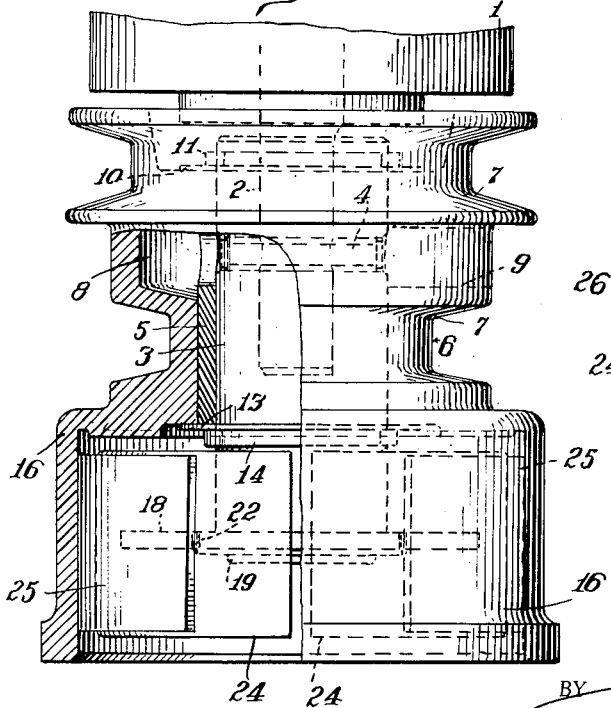
Fig. 4 is a side elevation of the clutch assembly, with a part thereof in section.

The driving sleeve 3 projects downward from the lower end of the hub of the pulley 6 into the center portion of the clutch drum 16 to a point substantially midway of the height of the latter in the embodiment illustrated. The lower end of the driving sleeve 3 carries a key plate 18. The key plate 18 is confined on the driving sleeve 3 by turned over portions 19 of the latter formed by flattening or peening the extreme end at intervals about the periphery thereof. A collar 20 has notches 21 spaced at intervals therearound on the inner periphery thereof to receive therein extruded portions of the turned over end 19 of the driving sleeve 3, thus preventing circumferential slippage of the collar relative to the driving sleeve. The collar 20 also has upturned fingers 22 thereon engaging in slots 23, formed in the key plate 18 diametrically on opposite sides of the latter, as shown in Fig. 3.

Figure 5:
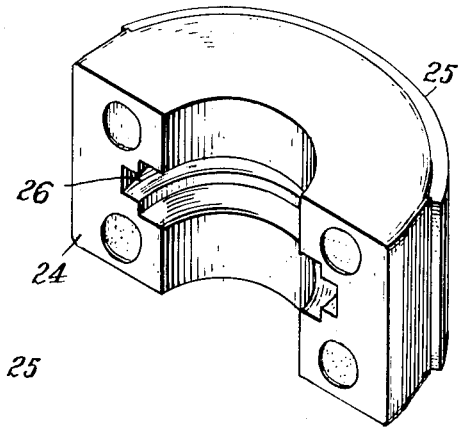
Fig. 5 is a perspective view of one of the clutch shoes, detached.

Clutch shoes are shown at 24, two of which are illustrated in this embodiment, and one of these is illustrated detached in Fig. 5.

Each of the clutch shoes extends throughout substantially half of the circumference of the clutch drum 16 and preferably has friction material 25 on the periphery thereof for engagement with the clutch surface on the inner diameter of the clutch drum 16.

Each of the clutch shoes 24 has a segmental slot 26 formed in the inner diameter thereof and extending radially outwardly to receive therein loosely and frictionally the adjacent end of the key plate 18. The slot 26 is shown as approximately midway of the height of the shoe 24 and extends preferably throughout the major portion of the thickness of the latter, shown more clearly in Fig. 3, and the end portion of the key plate 18 also extends throughout the major portion of the depth of the slot. The slot 26 in each of the clutch shoes 24 has an abutment 27 at each opposite side thereof, as shown in Fig. 3, in position for engagement by a lateral edge of the key plate 18, as the latter is rotated by the driving member of the clutch, this abutment 27 extending radially inward in overlapping relation with the adjacent side edge of the key plate, to form a driving connection from the key plate to the clutch shoe 24, but only at the forward edge portion of the latter, in the direction of turning movement. This relation causes a pulling action to be imparted to each clutch shoe upon rotation of the driving sleeve in either direction by the motor, which provides the proper slippage in starting until such time as the driving member reaches a predetermined speed of operation, which thereby will prevent jamming and stoppage of the motor. The contact of the driving member with the forward end of the clutch shoe facilities the proper operation of the latter.

At the same time, the driving shoes 24 are suspended frictionally on the opposite ends of the key plate 18, being held loosely by the frictional engagement of the top faces of the slots 26 with the top faces of the key plate. The outer ends of the elongated key plate 18 flare laterally in opposite directions from the longitudinal axis of the key plate and extend over a considerable lateral area of approximately one fourth of the circumference of the clutch, which will hold the shoes securely thereon for smooth operation, thus allowing gradual engaging movements of the shoes when the driving member reaches the predetermined operating speed.

This clutch assembly allows for two-way clutch engagement in either direction of movement of the driving member when the latter reaches the predetermined operating speed and yet without locking of the freely mounted clutch shoes until engagement is desired. When applied to a washing machine, the clutch may be located in close proximity to the driving motor, away from the drive shaft of the washing means, which thereby prevents accidental leakage of water into the clutch and damage to the clutch engaging faces thereof. At the same time, the centrifugal clutch operates to provide the proper slippage during starting of the motor in either direction without jamming or stalling the motor, and by a very simple and inexpensive device to install and use.

This clutch is simple in construction; contains no springs or levers; pulls equally well in either direction; operates automatically; compensates for wear; has no-load start; and is quiet in operation.

An important feature of the invention lies in the nature of the engagement of the driver with the shoes, which must precede the point of engagement of the friction surface of the shoes with the drum in the rotational direction, and be reversible. This may be done in various other ways than in the way described.

While the invention has been illustrated and described in one embodiment, it is recognized that variations and changes may be made therein without departing from the invention as set forth in the claims.

I claim:

1. In a centrifugal clutch, the combination of a clutch drum, a driving member, an elongated shoe having an engaging face in position for clutch engagement with the drum, and means operatively connecting the driving member with the shoe so as to apply a driving force to said shoe at a point between the forward edge of said engaging face and the forward end of the shoe, whereby every portion of said engaging face is subjected to a pulling force.

2. In a centrifugal clutch, the combination of a drum, a driving member mounted for rotary movement relative to the drum, an elongated shoe having an engaging face in position for clutch engagement with the drum upon rotation of said driving member, a key plate fixed to the driving member, said shoe having a slot therein receiving the key plate and having an abutment at the forward end portion thereof in position for engagement by the key plate upon rotation of the driving member, said engaging face being spaced on the opposite side of the abutment from said end.

3. In a centrifugal clutch, the combination of a drum, a driving member journaled for rotation relative to the drum, an elongated shoe having an engaging face in position for engagement with the drum upon rotation of the driving member, said shoe having abutments at the opposite end portions thereof, said shoe engaging face being located only intermediate the abutments, and a key plate fixed to the driving member and extending intermediate the abutments in position for engagement respectively therewith upon rotation of the driving member alternately in either direction.

4. In a centrifugal clutch, the combination of a drum, a driving member journaled for rotation relative to the drum, an elongated shoe having a lining on the outer face thereof in position for engagement with the drum upon rotation of the driving member, said shoe having a radially extending slot in the inner surface thereof and having shoulders at opposite ends of the shoe, said shoe lining extending along the face of the shoe only between the shoulders, and a key plate fixed to the driving member and extending radially into the slot intermediate the shoulders in position for selective engagement with the shoulders upon rotation of the driving member in either direction.

5. In a centrifugal clutch, the combination of a clutch drum, an elongated centrifugally actuated shoe having an engaging face in position for clutch engagement with the drum, and a generally radially disposed abutment disposed inwardly and angularly in advance of the engaging face in the direction of rotation of said shoe, and a driving member having a generally radially disposed driving connection with said abutment for rotating said shoe in said direction.

References Cited in the file of this patent

UNITED STATES PATENTS

| | | |
|---|---|---|
| 728,118 | Lehmann | May 12, 1903 |
| 994,379 | Faile | June 6, 1911 |
| 1,819,830 | Wersoll | Aug. 18, 1931 |
| 1,881,998 | Buchanan | Oct. 11, 1932 |
| 2,032,066 | Nieman et al. | Feb. 25, 1936 |
| 2,392,950 | Russell | Jan. 15, 1946 |
| 2,401,981 | Springhorn | June 11, 1946 |

FOREIGN PATENTS

| | | |
|---|---|---|
| 32,008 | France | Mar. 22, 1927 |
| 470,912 | Great Britain | Aug. 24, 1937 |